No. 676,036. Patented June 11, 1901.
A. R. HAMILTON.
ANIMAL TRAP.
(Application filed Sept. 18, 1900.)
(No Model.)
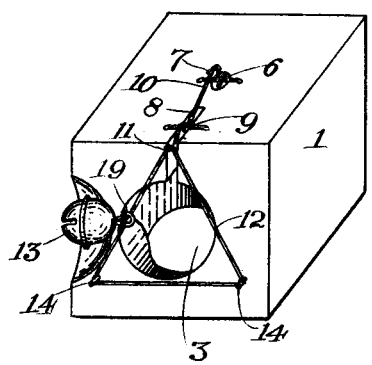
Fig. I.
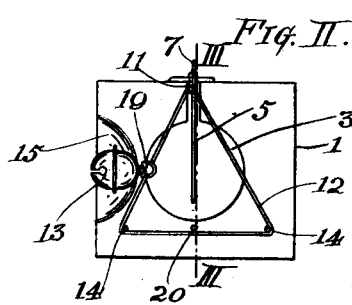
Fig. II.
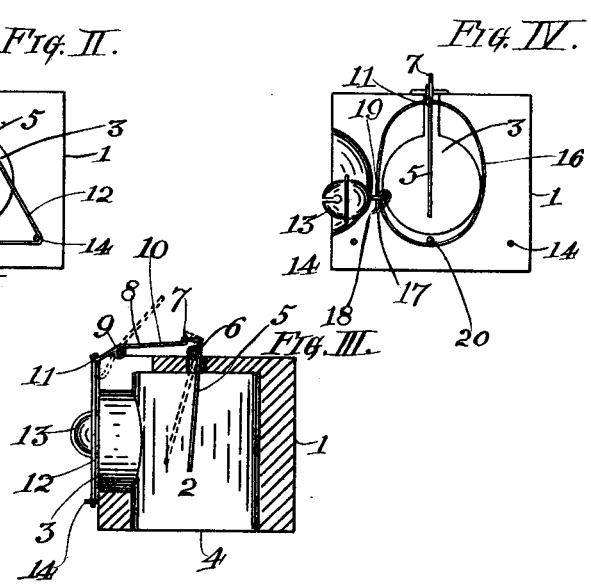
Fig. IV.
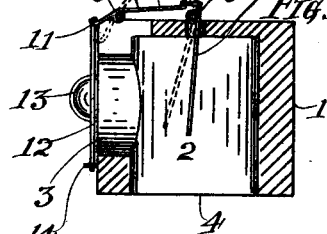
Fig. III.
Witnesses:
Robt. Train
M. H. Knight
Inventor:
A. R. Hamilton
by Knight Bro.
Attorneys.
THE NORRIS PETERS CO., PHOTO-LITHO., WASHINGTON, D. C.

UNITED STATES PATENT OFFICE.

ALBERT R. HAMILTON, OF LOS ANGELES, CALIFORNIA, ASSIGNOR OF FOUR-FIFTHS TO HENRY T. HOLLINGSWORTH AND HORACE L. CUTTER.

ANIMAL-TRAP.

SPECIFICATION forming part of Letters Patent No. 676,036, dated June 11, 1901.

Application filed September 18, 1900. Serial No. 30,419. (No model.)

*To all whom it may concern:*

Be it known that I, ALBERT R. HAMILTON, a citizen of the United States, residing at Los Angeles, (with post-office address at 217 West Second street, in said city,) in the county of Los Angeles and State of California, have invented certain new and useful Improvements in Animal-Traps, of which the following is a full, clear, and exact description, reference being had to the accompanying drawings, which form a part of this specification.

My invention relates to a device for attaching to objectionable animals—such as mice, gophers, &c.—a bell or its equivalent whereby other animals of the same nature become alarmed and are driven from the premises; and my invention consists in certain features of novelty hereinafter described and claimed.

Figure I is a perspective of my improved trap. Fig. II is a front elevation. Fig. III is a section taken on line III III, Fig. II. Fig. IV is a front elevation showing a modification of the expansible collar.

Referring to the drawings, 1 represents a block having an interior chamber 2, with a front orifice 3 leading to the chamber.

4 represents an orifice in the bottom of the block, connecting with the chamber 2.

5 represents a pendent rod on which bait may be placed, said rod extending into the chamber 2 and being pivoted at 6 to the upper side of the block. The upper end of the bait-rod 5 is provided with a catch 7, extending at right angles with the body of the rod.

8 represents a trigger-rod pivoted at 9 to the top of the block, said trigger-rod having a long arm 10, adapted to engage the catch 7 of the bait-rod, and having a hook 11 extending forwardly of the pivot 9 and slightly beyond the front face of the block.

12 represents a collar made of any suitable material adapted to expand and contract, and 13 represents a bell secured to the collar.

14 represents pins secured to the block 1, over which the expanding collar is passed in setting the trap, said collar being also passed over the hook 11, bearing down upon the same and causing the trigger 8 to remain in contact with the catch 7 when the trap has been set.

The block 1 is preferably provided with a recess 15, in which the bell rests when the trap is set.

In Fig. IV, I have shown a slight modification in which a collar 16 is formed of spring metal, being connected at one of its ends with the bell 13, as shown at 17, and having a free end 18, adapted to pass through the loop 19 of the bell, said loop serving as a keeper for the free end of the collar. In setting the trap with the spring-metal collar I pass the collar over a pin 20 and over the hook 11.

The trap is operated as follows: Bait is secured to the bait-rod 5, the bell is placed in the recess 15, and the expansible collar placed upon the pins and hook of the trigger-rod, the catch 7 engaging the rear end of the trigger-rod. The animal in attempting to reach the bait passes his head through the collar and in removing the bait releases the trigger, which assumes the position shown in dotted lines, Fig. III. The collar thus being released passes from the hook 11 and the pins on which it has been placed and contracts about the neck of the animal, leaving the animal free to run about, and in doing so the bell attached to the collar alarms the other animals and they are thus driven from the premises.

I do not desire to confine myself to any special form or material in the construction of the collar, as any collar adapted to expand and contract would come within the scope of my invention.

I claim as my invention—

1. In a device of the kind described, the combination of a body with means for attracting animals, a recess in said body, and a detachable contracting device, a bell secured to said device, said recess adapted to hold the bell against movement while the trap is set.

2. In a device of the kind described, the combination of a block having a chamber, an orifice leading to the chamber, a bait-rod extending into the chamber, a trigger adapted to connect with said bait-rod, a hook on said trigger, pins in the face of the block, an expanding collar adapted to be secured to said hook and pins and a bell connected with the collar, substantially as set forth.

3. In a device of the kind described, the combination of a block having a chamber with side and bottom orifices, a bait-rod extending into the chamber, a trigger-rod adapted to engage the bait-rod, a removable expansible collar, means for holding said collar in an expanded position on the face of the block and surrounding the side orifice, a recess in the face of the block, and a bell connected with said collar and adapted to rest in said recess while the trap is in a set position, substantially as set forth.

ALBERT R. HAMILTON.

Witnesses:
J. W. KEMP,
M. H. KNIGHT.